Patented Nov. 5, 1935

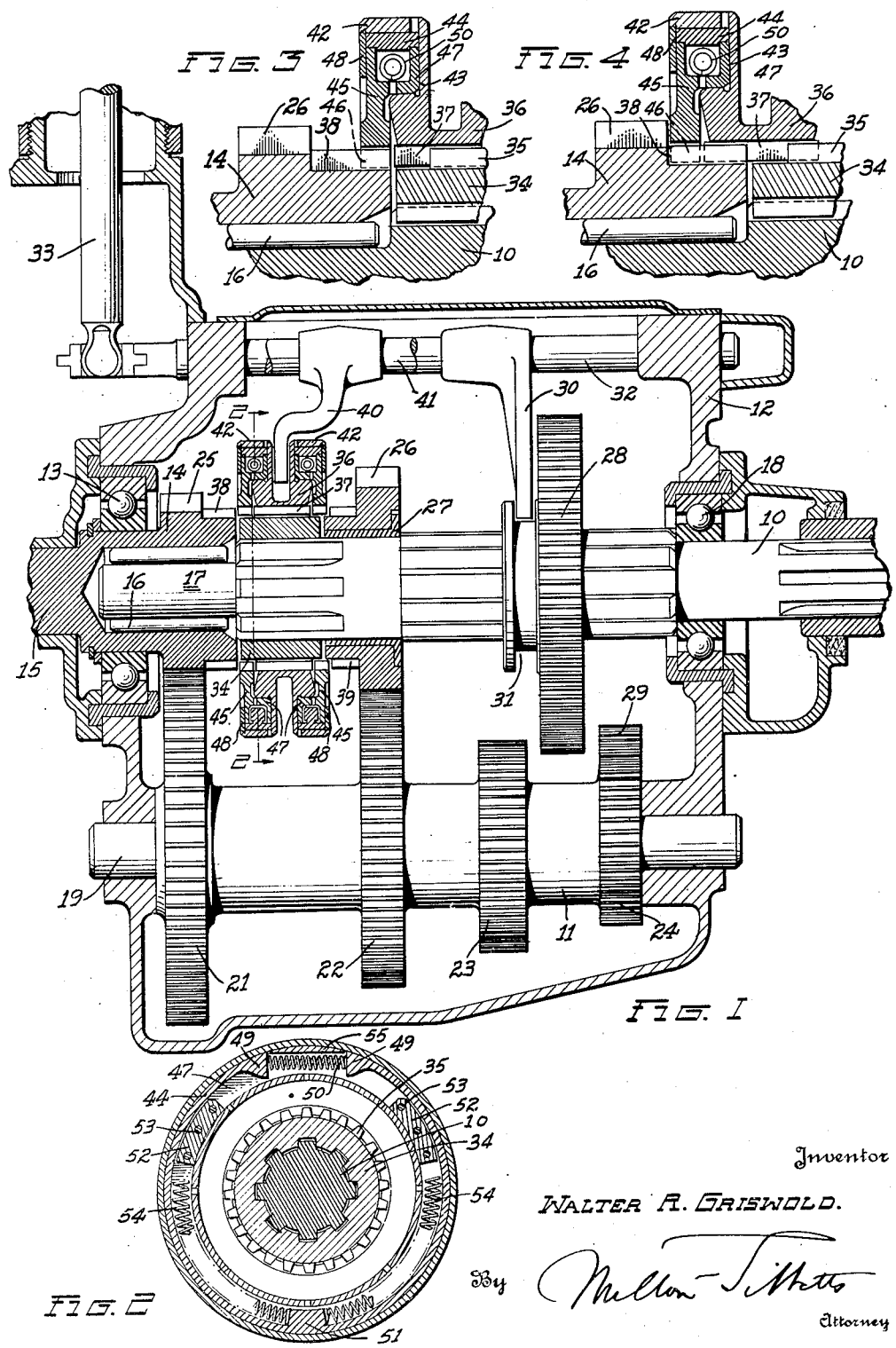

2,019,783

UNITED STATES PATENT OFFICE 2,019,783

TRANSMISSION MECHANISM

Walter R. Griswold, Detroit, Mich., assignor to Packard Motor Car Company, Detroit, Mich., a corporation of Michigan Application January 19, 1932, Serial No. 587,559

9 Claims. (Cl. 192—53)

This invention relates to motor vehicles and more particularly to the transmission mechanism of such vehicles.

In the operation of motor vehicles, it is requisite to smooth gear changing that the gears which are to be meshed have substantially the same peripheral speed before engagement of the gear teeth. Thus after disconnection of the vehicle clutch and the previously engaged gears of a conventional transmission, the operator must either wait for a more rapidly moving gear element to lose speed, or in some instances must accelerate a more slowly moving gear by reconnecting it through the clutch. These maneuvers require a considerable measure of skill on the part of the operator and also prevent the free and rapid changing from one gear train to another as the contingencies of vehicle operation may dictate, so that gear changing has come to be considered as perhaps the most difficult task incident to the operation of a motor vehicle.

To assist the operator in making rapid and quiet shifts it has been previously proposed to synchronize the gears to be meshed by various means, such as friction clutches. Such devices, however, have been open to certain objections. The mechanisms employed have been in general cumbersome and complicated. Frequently the friction elements have not been applied with sufficient pressure to effect proper synchronization within the very short time interval available for this purpose, or if so applied, the operating mechanism has been subjected to excessive wear. This has made it necessary to release the synchronizing means immediately upon engagement of the gears, which in turn has required delicate and complicated means to determine the exact time of application and of release.

One of the objects of this invention is to provide a motor vehicle transmission having an improved device for synchronizing rotating elements which is simple and effective.

Another object of the invention is to provide a motor vehicle transmission with a device of the character designated which can be assembled and removed as a unit from the driven shaft.

Another object of the invention is to provide a transmisison synchronizing device in which the engagement pressure of friction elements shall be considerably augmented to bring rotating elements quickly to the same speed.

Other objects of the invention will appear from the following description taken in connection with the drawing which forms a part of the specification, and in which:

Fig. 1 is a view, partially in side elevation and partially in vertical section through a motor vehicle transmission constructed in accordance with the invention;

Fig. 2 is a view in section taken substantially on line 2—2 of Fig. 1;

Figs. 3 and 4 are enlarged fragmentary sectional views of part of the transmission shown in Fig. 1, illustrating successive positions of the device during a characteristic gear changing operation.

Referring to the drawing, in Fig. 1 is shown a motor vehicle transmission comprising a splined transmission shaft 10 and a countershaft or gear spool 11, mounted in a housing or transmission case 12. The front wall of the housing carries a suitable bearing 13 in which is mounted the enlarged rear end 14 of a driving shaft 15, which may be the vehicle clutch shaft, driven from the vehicle engine through conventional clutch mechanism (not shown). The enlarged end 14 of the clutch shaft is formed with an axial recess for the reception of a bearing 16, in which the reduced forward end 17 on the transmission shaft 10 is journaled. The rear end of the shaft 10 is journaled in a bearing 18, supported in the rear wall of the housing 12, and is connected in the usual way to the propeller shaft to drive the vehicle, this connection not being shown.

The countershaft 11 is in the form of a hollow spool, mounted to rotate on an arbor 19, supported at its ends by the transmission case walls, and this spool is formed with a number of integral gears 21, 22, 23 and 24. Of these, the gear 21 is in constant mesh with a gear or pinion 25, formed on the enlarged end 14 of the shaft 15, so that the countershaft 11 is continuously connected to and driven from the clutch shaft 15 in the well known manner. The gear 22 is also continuously in mesh with a gear 26 which is mounted for rotation on a bearing sleeve 27, pressed or otherwise rigidly mounted on the shaft 10, as will be readily understood.

Gears 23 and 24 constitute the low speed and reverse gears respectively, and are adapted to drive the gear 28 which is splined to and slidable on the shaft 10, this gear 28 being directly engageable with the gear 23. It may be driven from the gear 24 through a reverse idler pinion 29 in the well known manner. Such sliding action is effected in the usual way by means of a shifter fork 30, which engages in a groove 31 in the body of the gear 28, this fork being actuated by a shifter rod 32 slidably mounted in suitable bearings in the upper part of the cover portion of the casing 12. The shifter rod 32 is selectively actuated by a lever 33, of usual form, which may be manually operated by the vehicle driver in the well known manner. Thus in the illustrated embodiment of the invention, gear 28 may be moved to mesh with gear 23, to provide a first speed, or connected through pinion 29 to gear 24 to provide a reverse. Second speed is provided by connecting the constant mesh gear 26 to the shaft 10; and third or high speed is secured by coupling the shafts 10 and 15, thus providing a direct drive.

To provide the second and high speed connections described, the forward portion of the shaft 10 is provided with a unitary device which serves the purpose of clutching the driven shaft with either of the gears 25 and 26 and, at the same time, providing a synchronized relation therebetween previous to the clutching action. This device includes a hub 34 which is splined on the forward end of the driven shaft 10 and which has external splines 35, such hub being removably fixed on the end of the shaft and fixed to rotate therewith. A radially extending web member 36 is provided with internal splines 37 which engage with the external splines 35 on the hub, the web member being rotatable with the hub and slidable axially relative thereto. An extension of the shaft end 14 is provided with teeth 38 and the gear 26 is provided with an extension having teeth 39 so that by shifting the web member axially on the hub, the teeth thereof will mesh with the teeth 38 or with the teeth 39. The web member is actuated by means of a fork 40 which is fixed on a shifter rod 41 arranged to be actuated by the lever 33. It will be evident that when web member 36 is moved so that the teeth 37 engage with the teeth 38, the gear 25 will transmit the rotation directly to the shaft 10 through the splined hub 34 and that when the teeth 37 mesh with the teeth 39 of the gear 26, then the second speed will result through the gear train 25, 21, 22 and 26, and the hub member 34 to the shaft 10.

To perform the clutch operations just described without shock or clash, this invention provides a synchronizing device adapted to bring the pairs of clutch teeth 37—38 or 37—39 to the same speed before engagement. For this purpose, the web member is formed with a pair of axially extending peripheral flanges or friction drums 42 formed with circularly extending recesses 43. Within each of the recesses is arranged a friction means in the form of a band 44. These friction members each substantially encircle a ring member 45 provided with internal teeth 46 adapted to mesh respectively with the teeth 38 and 39 and with the external splines on the hub 34. The outer portions of the ring members are formed with U-shaped offset rim portions 47 which extend into the channel or recess 43 of the associated web member, so that they are telescoped by the friction member. A closure ring 48 is fixed to each of the ends of the drums 42 in order to maintain the friction members and the ring members in assembled relation with the web members.

The ends of the friction members are provided with abutments 49 which are spaced apart by a coil spring 50. A spring guide 55 is loosely mounted within each of the rim portions 47 and intermediate the abutments 49 to prevent contact of the spring with the periphery of the friction drum. The friction members are also provided with an abutment 51, this abutment and the abutments 49 extending within the U-shaped rims of the ring members. The ring members are provided with a pair of abutments 52 secured within the U-shaped rims thereof by suitable fastening means, such as rivets 53, and between such abutments and the abutment 51 of the friction members I arrange coil springs 54. When these springs are extended and the device is ineffective, the springs 54 are fully extended and are several degrees, angularly, short of engaging the abutments 52, their other ends being anchored to the abutment 51.

The spring 50 normally exerts pressure against the abutments 49 tending to expand the friction band 44 so that there is a slight frictional engagement thereof with the drum 42 of the positive clutch member and thus the friction band will rotate with the positive clutch member.

When it is desired to shift the clutch device from a neutral position, as shown in Fig. 1, into engagement with the shaft 15 to form a connection with the shaft 10, the shifter 40 is moved to the left whereupon the ring member at the left will mesh with the teeth 38, as shown in Fig 3. The ring member is thus positively engaged with the drive shaft so that it rotates therewith and during initial rotation one of the abutments 52 will move toward the abutment 51, and after a limited rotation will engage against the spring 54 and thus provide a resilient pressure against the abutment 51 causing its rotation therewith. In this manner the friction member is rotated and its frictional engagement with the associated drum will rapidly bring the speed of the positive clutch member up to that of the drive shaft. Thus it will be seen that the springs 54 form a cushioning connection between the ring member and the friction member, which permits the ring member to be started with as little load as possible, thus avoiding considerable shock.

Rotation of the friction band tends to increase the frictional resistance of the leading half with the drum 42 so that a servo action is provided which rapidly brings the positive clutch member 36 up to the speed of the driving shaft. This synchronization takes place so rapidly that hesitation in the shifting movement of the clutch is not required, and a continued movement of the clutch device toward the left will bring the teeth 37 into engagement with the teeth 38, as shown in Fig. 4, and there will be no clash because the positive clutch member has previously been synchronized with the driving shaft. In order to place the clutch device in a neutral position the shift lever 40 is moved to the right into the position shown in Fig. 1. As the two synchronizer devices are the same and operate in the same manner, an explanation of the operation of the synchronizer device when the clutch device is moved into engagement with gear 26 is not thought to be necessary.

It will be seen that I have provided a compact clutch and synchronizing device which is in the form of a unitary structure readily assembled with or removed from the driven shaft 10. It will also be observed that the clutch and synchronizing device herein described is efficient in operation and can function without any hesitancy in the shifting movement due to the servo action of the synchronizing structure.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a transmission mechanism, a driving member, a driven member, a positive clutch member shiftably mounted on one of said members and engageable with the other member, an element positively engageable with the other member, a friction drum fixed to the positive clutch member, and resilient means including a servo element associated with the first mentioned element and engageable with the friction drum, said servo element creating a synchronizing torque between the drum and the first mentioned element upon shifting of the positive clutch member toward connecting relation.

2. In a transmission mechanism, a driving member, a driven member, a positive clutch member mounted on the driven member and shiftable to engage the driving member, and synchronizing mechanism for the members carried by the positive clutch member and operable in advance thereof comprising a ring member positively engageable with the driving member, a friction drum fixed to the positive clutch member, and friction means engageable with the drum, said friction means being expanded by the ring member rotation when engaged with the driving member.

3. In a motor vehicle transmission, a driving member, a driven member, a drum on one of said members, a servo operable friction band rotating therewith, a positive clutch element engageable with the other of said members, a resilient friction band operating means including an abutment between the positive clutch element and the drum, and resilient driving means between the abutment and the positive clutch element.

4. In a motor vehicle transmission, a driving member, a driven member, a positive clutch element between said members, a friction clutch between said members including a synchronizing element and friction clutch actuating means, said actuating means being engageable by said positive clutch element, said clutch actuating means, during said engagement, moving initially with respect to the synchronizing element and thereafter serving resiliently to operate the friction clutch.

5. In a transmission mechanism, a driving member, a driven member, a ring member engageable with one of said members, a positive clutch member on the other of said members, a drum on said positive clutch member, a servo operating band frictionally engaging the drum, resilient means maintaining the band in frictional engagement with the drum, and a resilient driving means between the ring member and the band.

6. In a transmission mechanism, a driving member, a driven member, a drum on one of said members, a positive clutch element engageable with the other member, a servo band associated frictionally with the drum, abutment means on the positive clutch element and on the band, and resilient means between the abutment means on the positive clutch element and on the band.

7. In a transmission mechanism, a driving member, a driven member, a positive clutch element fixed to one of said members, another positive clutch element slidably mounted on the other of said members to engage with the first mentioned positive clutch element, and synchronizing mechanism intermediate said clutch elements comprising a clutch band frictionally engaging one of the elements and resilient drive means intermediate the other clutch element and said band, said resilient drive means being actuated upon shifting of the positive clutch element to create a synchronizing torque.

8. In a transmission mechanism, a driving member, a driven member, a positive clutch element fixed to one of said members, another positive clutch element provided with a drum slidably mounted on the other of said members to engage with the first mentioned positive clutch element, a ring member telescoped by the drum, said ring member and said positive clutch element being adapted to be moved into positive engagement with the fixed clutch element, means holding the ring member in a fixed axial relation with the slidably mounted positive clutch element, a friction band intermediate the periphery of the ring member and the drum, spring means frictionally engaging the band with the drum, an abutment on the band, a pair of spaced abutments on the ring member, the abutment on the band being intermediate the abutments on the ring member, and coil springs between the band abutment and the ring abutments.

9. In a transmission mechanism, a driving member, a driven member, clutch teeth fixed on one of said members, another positive clutch element slidably mounted on the other of said members to engage with the clutch teeth, a drum extending from the slidably mounted clutch element, a ring member telescoped by the drum and retained axially with the slidable clutch element, said ring member having teeth adapted to engage with the positive clutch teeth when moved axially in advance of the engagement of the slidably mounted positive clutch element, a U-shaped rim portion on the ring member, a friction band surrounding the U-shaped rim of the ring member, spring means frictionally engaging the band with the drum, an abutment on the friction band, abutments on the ring member spaced from the abutment on the friction band, and coil springs within the U-shaped rim of the ring member intermediate the band abutment and the abutments on the ring member.

WALTER R. GRISWOLD.